(12) United States Patent
Al Rashidi

(10) Patent No.: US 7,007,494 B2
(45) Date of Patent: Mar. 7, 2006

(54) PORTABLE FOOD STORAGE CONTAINER

(76) Inventor: Falah M. Al Rashidi, P.O. Box 240, Salmiya, 22003 (KW)

( * ) Notice: Subject to any disclaimer, the term of this patent is extended or adjusted under 35 U.S.C. 154(b) by 0 days.

(21) Appl. No.: 10/897,070

(22) Filed: Jul. 23, 2004

(65) Prior Publication Data

US 2006/0016213 A1   Jan. 26, 2006

(51) Int. Cl.
*B60H 1/32* (2006.01)
(52) U.S. Cl. .......................... 62/244; 62/457.9; 165/41
(58) Field of Classification Search ................ 62/239, 62/244, 245.1, 457.9; 165/41
See application file for complete search history.

(56) References Cited

U.S. PATENT DOCUMENTS

| | | | |
|---|---|---|---|
| 3,505,830 A | 4/1970 | Koerner | |
| 3,916,639 A | 11/1975 | Atkinson | |
| 4,478,052 A | 10/1984 | McDowell | |
| 4,936,103 A | 6/1990 | Newman | |
| D324,627 S | 3/1992 | Rellstab | |
| 5,165,646 A | 11/1992 | Gewecke | |
| 5,181,555 A | 1/1993 | Chruniak | |
| 5,203,833 A | 4/1993 | Howell | |
| 5,355,694 A | 10/1994 | Morrow et al. | |
| 5,588,480 A | 12/1996 | Armanno, Sr. | |
| D430,277 S | 8/2000 | Schmulling | |

*Primary Examiner*—William E. Tapolcai
(74) *Attorney, Agent, or Firm*—Dennison, Schultz, Dougherty & MacDonald

(57) ABSTRACT

A portable food storage container as heated and cooled by an automobile heater or air conditioner. The storage container includes an outer structure, an inner metal chamber and a layer of insulation between the outer structure and inner metal chamber. The container also includes a cover with a light, fan, one or more battery packs and one or more switches on the inner surface of the cover. The switches are operable from the outside of the container. A conduit such as a flexible hose connects the chamber to an air vent from the automobile's heater and air conditioning system. A valve is also provided to isolate the container from the automobile heating and cooling system. Further, a filter may be installed between the container and heater in order to filter air entering the container.

9 Claims, 4 Drawing Sheets

PORTABLE FOOD STORAGE CONTAINER

FIELD OF THE INVENTION

This invention relates to a portable food storage container and more particularly to a food storage container which is heated and cooled by an automobile heater and air conditioner.

BACKGROUND FOR THE INVENTION

A common method for transporting food that requires refrigeration is to place the food in an insulated box with ice. Such boxes are typically used for outdoor meals where several people are expected. Accordingly, such boxes which are typically made of styrene are designed for several persons as well as sufficient ice for long trips. Accordingly, such boxes are relatively large and cumbersome and may be susceptible to damage when the outer layer is Styrofoam or the like.

Another problems associated with such boxes is that the ice melts filling the lower portion of a container with water. Therefore, the food placed in the container must be packaged to avoid damage from the water.

An alternative to the ice in an insulated box resides in a small refrigeration unit that can be placed in a motor vehicle and powered by a battery or by the motor vehicles electrical system. These small refrigerators typically plug into a cigarette lighter socket. Unfortunately, such units usually have relatively poor refrigeration, are relatively heavy and expensive. Accordingly, they have not been widely accepted in the marketplace.

Another problem with the aforementioned devices is that they fail to provide heat to maintain heated foods at a desired temperature.

A more recent approach to maintaining food at a desired temperature during transportation is disclosed in U.S. Pat. No. 5,203,833 of Howell. As disclosed therein, a food storage container is heated and cooled by conditioned air in a motor vehicle. The container consists of a housing having a compartment for the storage of food. The compartment is connected to a conduit for directing conditioned air into the compartment for heating and cooling the food.

It is now believed that there may be a commercial market for an improved food storage container in accordance with the present invention. It is believed that a market may exist for a relatively compact portable food storage container which overcomes problems associated with prior art devices.

For example, the food storage containers in accordance with the present invention incorporate an exhaust fan and light, are durable, protected against rust and water damage, easily positioned in and removed from a motor vehicle and can be used to heat or cool food contained therein. In addition, the food storage containers include a battery operated electrical system for the fan and light which is positioned within a cover and operable from outside of the container. It is also believed that the containers in accordance with the present invention can be manufactured from readily available raw materials at a competitive price.

BRIEF SUMMARY OF THE INVENTION

In essence, the present invention contemplates a portable food storage container which is heated or cooled by an automobile heater or air conditioner. The storage container includes a rigid box-like outer structure which is made of a rigid plastic such as polyethylene, polyester or other plastics which can withstand relatively rough use without cracking or breaking. The storage container also includes a box-like inner metal compartment and a box-like intermediate layer or structure disposed between the outer rigid structure and the inner metal compartment in a nested relationship. Each of the outer structure inner metal compartment and intermediate structure include a top, bottom and four upwardly extending or upright side walls and an opening in the top. In a preferred embodiment of the invention, the structure includes an open top wherein the opening is bounded by the four upright walls.

A rigid cover of the same material as the outer rigid structure is pivotally attached to the outer rigid structure for opening and closing the food storage container.

The plastic cover includes inner and outer surfaces and a shallow wall surrounding the inner surface to form a lip which preferably overlaps the four upwardly extending walls. A fastener is also provided for maintaining the cover in a closed position. An important feature in the present invention resides in the disposition of a fan, light, battery, electrical circuit and switch on the inner surface of the cover. It is also important that the switch is operable from outside of the container. In a preferred embodiment of the invention, the cover includes an air outlet such as a relatively small opening adjacent to the fan for exhausting air from within the chamber or circulating air within the chamber. An air inlet is disposed in one of the side walls of the rigid plastic structure and extends through the inner metal compartment and the intermediate structure for introducing heated or cooled air into the container. In addition, an elongated flexible conduit having a first end attached to the air inlet and a second end adapted for attachment to an automobile air vent is also provided for delivering heated and cooled air into the container to heat or cool the contents therein.

The invention will now be described in with the accompanying drawings wherein like reference numerals have been used to indicate like parts.

DESCRIPTION OF THE PREFERRED EMBODIMENTS OF THE INVENTION

Figure 1:
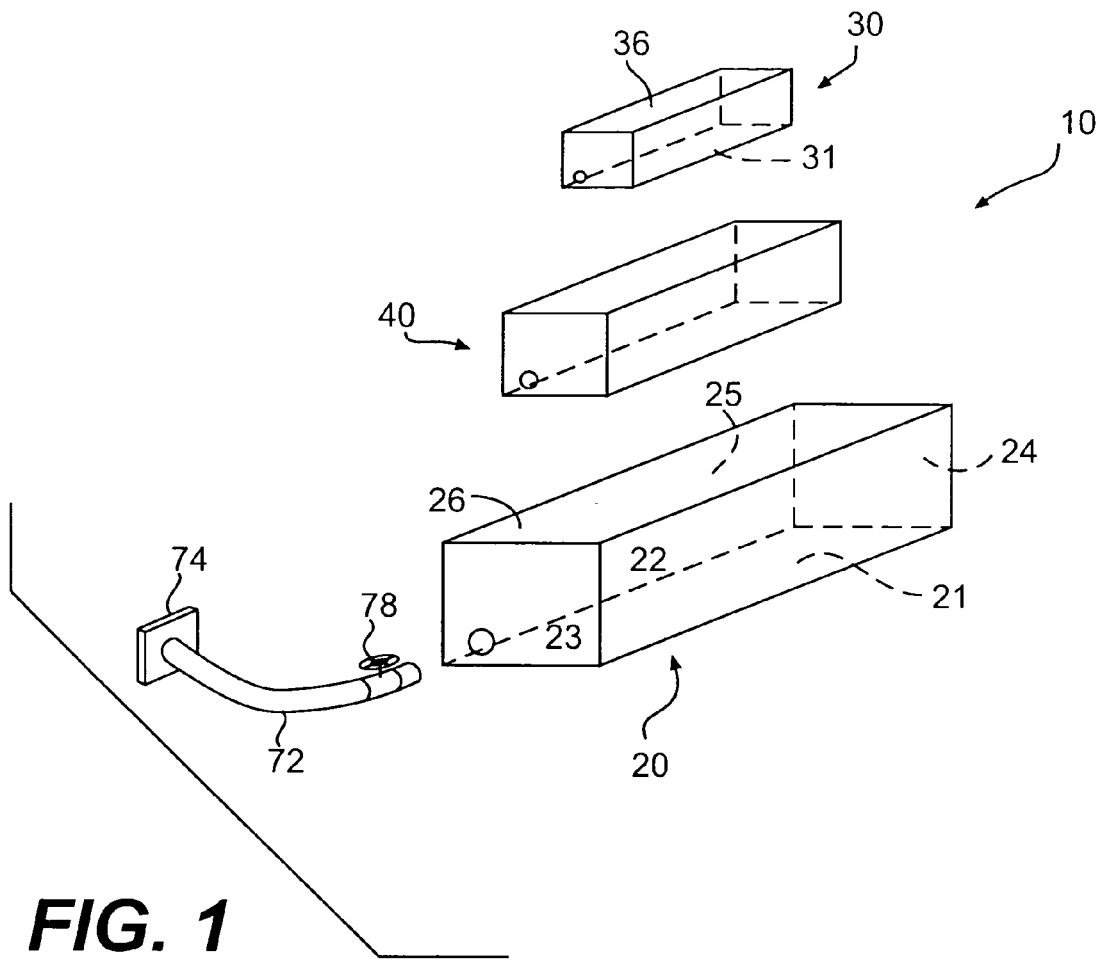
FIG. 1 is an exploded perspective view of a portable food storage container in accordance with a preferred embodiment of the invention.

A portable food storage container which is heated and cooled by a motor vehicle heater and air conditioning system is illustrated in FIGS. 1–4. As illustrated therein, a food storage container 10 includes a rigid box-like outer structure 20 having a bottom 21, and four upwardly extending sidewalls 22, 23, 24 and 25. The upwardly extending sidewalls 22, 23, 24 and 25 also define an open top 26. The rigid box-like structure is preferably made of a durable rigid plastic and may be molded as will be well understood by persons of ordinary skill in the art. The plastic should be resistant to cracking and capable of withstanding a relatively broad range of temperatures and relatively sudden changes in temperature. For example, if cooled or heated for a period of time and then removed from the automobile to a relatively hot or cold ambient temperature, the outer structure should withstand the temperature change without damage. Plastic such as polyethylene, polyesters or other suitable plastics may be used.

The storage container 10 also includes an inner metal compartment 30 which also defines a box-like structure with an open top 36. The inner metal compartment 30 like the outer structure 20 also includes a bottom 31 and four upwardly extending sidewalls 32, 33, 34 and 35. Like the structure 10, the four upwardly extending sidewalls 32, 33, 34 and 35 define the open top 36. This inner metal compartment may be made of galvinized steel, zinc or other metal which is resistant to rust and damage from water or other spilled liquids such as juices, soft drinks etc.

Figure 1A:
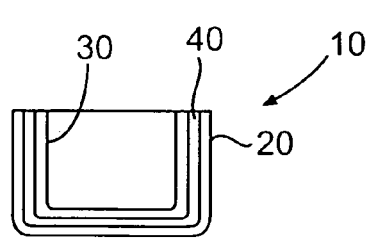
FIG. 1A is a sectional view of the food storage container which illustrates its nested structure.

An intermediate insulating structure 40 is disposed between the outer structure 20 and the inner metal compartment 30. The structure 40 may have a box-like form similar to the structure 20 and chamber 30 or comprise a plurality of flat sheets which are placed between the bottom and sidewalls of the outer structure 20 and bottom 31 and sidewalls of the inner metal chamber. In either case, the structure 40 includes a bottom 41 and four upwardly extending sidewalls 42, 43, 44 and 45. The upwardly extending sidewalls 42, 43, 44 and 45 also define a top 46. In a preferred embodiment of the invention the outer structure 20, inner metal compartment 30 and intermediate insulating structure 40 are positioned in a nested relationship as shown in FIG. 1A.

Figure 1B:
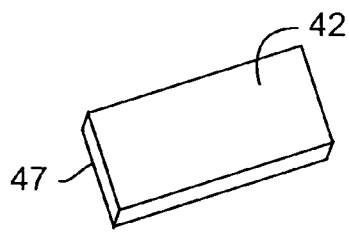
FIG. 1B is a perspective view illustrating a panel of an intermediate structure.

As shown in FIG. 1B, a sidewall 42 may be made of a separate piece of wood, styrofoam, cardboard or the like and fitted into the space between the sidewalls 22 and 32 etc. As shown in FIG. 1B the sidewall may also have a metallic foil layer or coating 47 on one side thereof.

Figure 2:
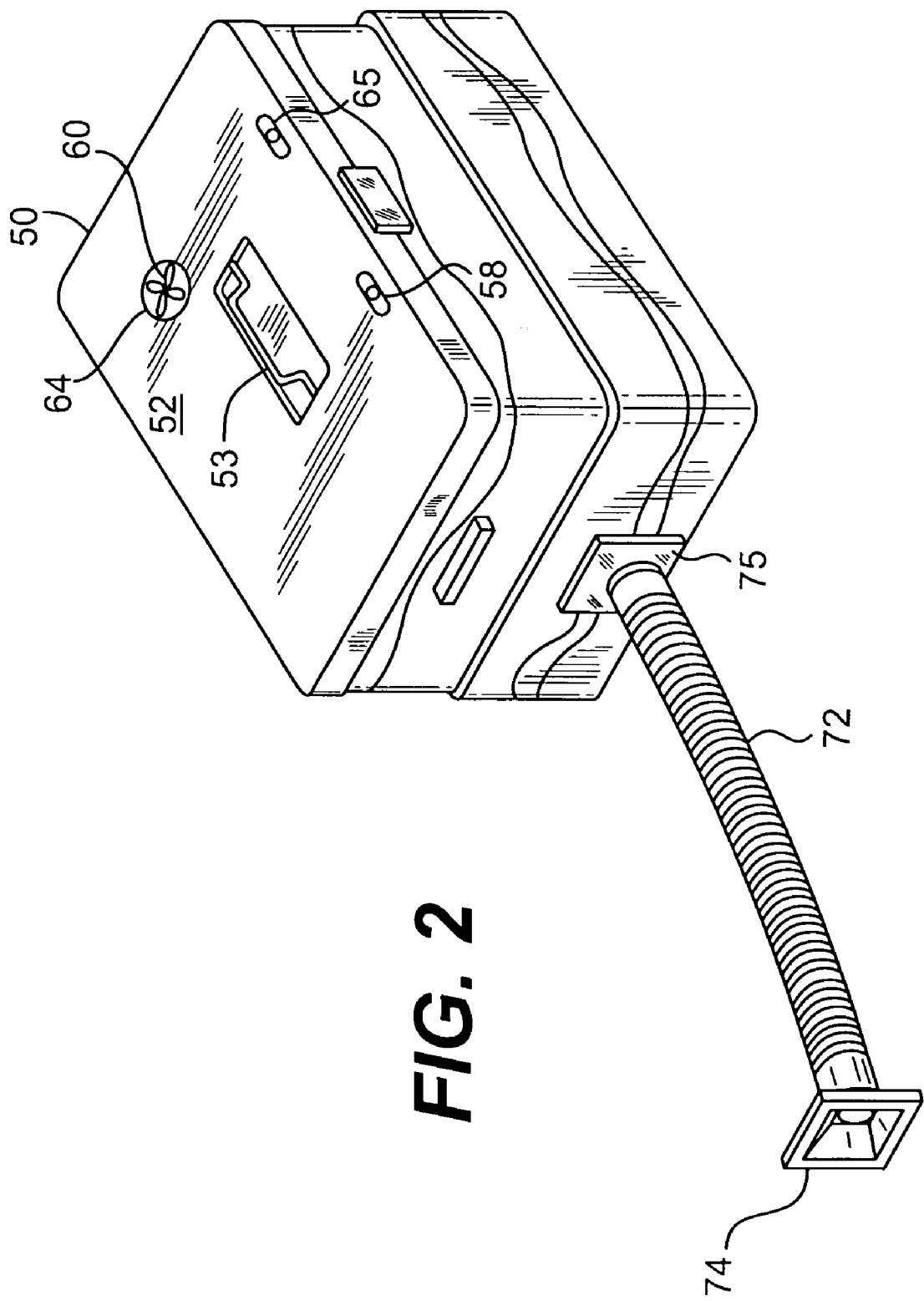
FIG. 2 is a perspective view of the food storage container shown in FIG. 1 with the cover in a closed position.
Figure 4:
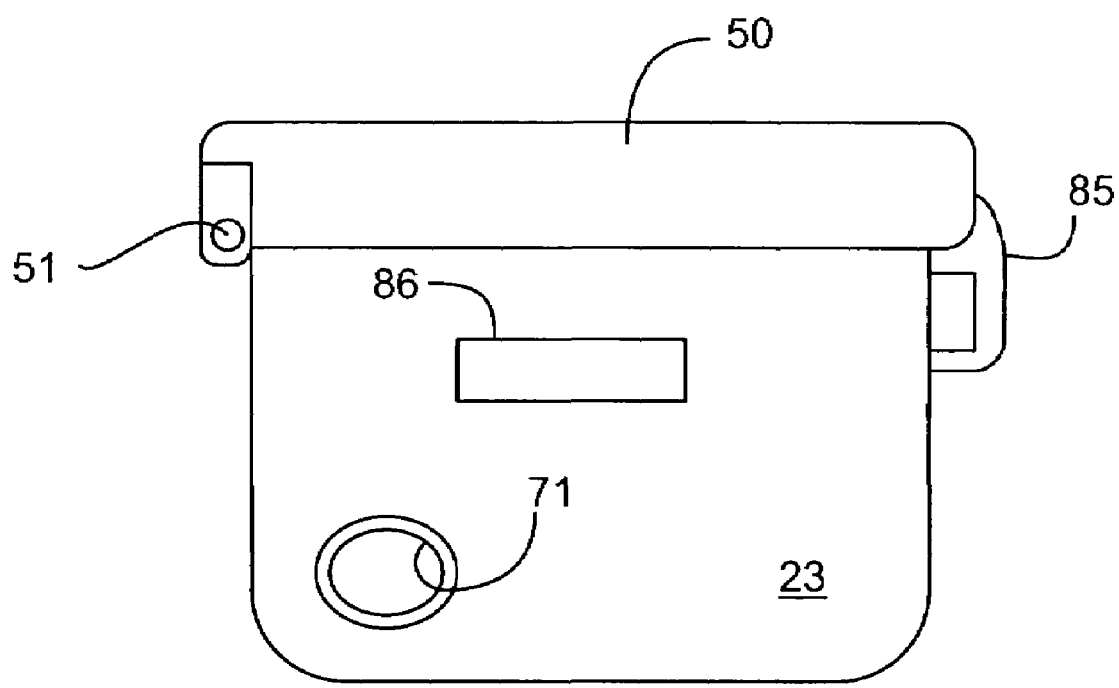

The storage container 10 also includes a cover 50 which is preferably made of the same material as the outer structure 20 and which is typically mounted to the outer structure 20 by a hinge assembly 51 as shown in FIG. 4. The cover 20 also includes an outer surface 52 and recessed handle 53 as shown in FIG. 2.

Figure 3:
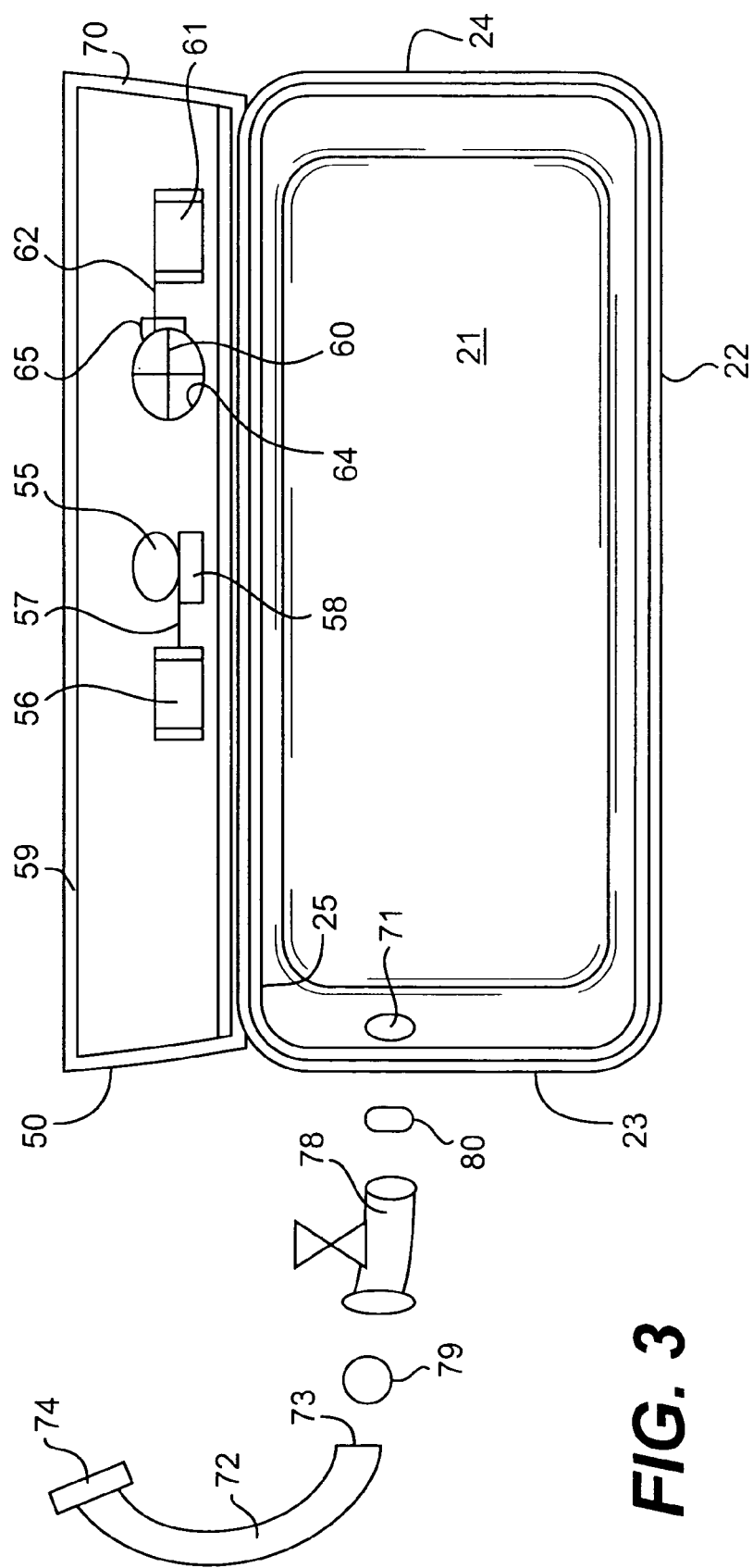
FIG. 3 is a schematic illustration of the food storage container shown in FIGS. 1 and 2 which illustrates the positioning of the light, batteries, and fan; and, FIG. 4 is a side elevational view of a storage container showing an overlapping cover.

FIG. 3 is a schematic illustration that shows the basic components of a food storage container in accordance with a preferred embodiment of the invention. As shown therein, an inner surface 54 of the cover 50 serves as a base for the electrical components. For example, a light 55 which includes a lamp socket and bulb is fixed to the inner surface 54 by any suitable means such as a clip-on fastener or by adhesive. The light 55 is connected to a battery 56 by an electrical circuit or wire 57. A suitable switch 58 which is operable from outside the container 10 is also shown in FIG. 2.

A fan 60 is also disposed on and fixed to the inner surface 54 of the cover 50 and is connected to a separate battery 61 by means of an electrical wire 62. A switch 63 is also provided for turning the fan on and off. A small aperture 64 of about 1½ inch diameter is provided in the cover 50 adjacent to the fan 60. A switch 65 is used to turn the fan on and off.

As shown in FIG. 3, the cover 50 also includes a shallow wall 70 which extends upwardly and around an inner surface 59. This shallow wall may overlap the top of a rigid outer structure 20 when the cover is in a closed position.

The storage container 10 also includes an air inlet 71 which extends through the sidewalls 23, 33 and 43 to allow the cooling or heating media to be directed into the storage container 10.

The cooling or heating air is directed into a conduit 72 which includes a coupling 74 for connecting the conduit 72 to an outlet or vent (not shown) of a motor vehicle heater and air conditioner. The heated and cooled air passes through the conduit to its opposite end 73. The opposite end 73 of the conduit 72 is connected to the storage container 10 by means of the air inlet 71. An adapter 75 may be used to fix the conduit 72 to the outer structure 20 as shown in FIG. 2.

An air valve or regulator 78, air filter 79 and cut-off valve 80 are preferably installed within the conduit 72 or between the end 73 and the air inlet 71. The air regulator regulates the volume of hot or cold air entering the storage container 10 while the cut-off valve 80 is used to close the air inlet as for example when the conduit 72 is disconnected and the storage container removed from the car as a portable unit.

The air filter 79 is provided to keep smoke or other particles and the like from entering the storage chamber 10.

FIG. 4 illustrates the shallow wall as well as a fastener 85 for maintaining the cover 50 in a closed position. FIG. 4 also illustrates one of a set of handles 86 disposed on the sides (sidewall 23) of the outer structure 10.

While the invention has been described in connection with its preferred embodiments, it should be recognized that changes and modifications may be made therein without departing from the scope of the appended claims.

What is claimed is:

1. A portable food storage container which is heated and cooled by an automobile heater and air conditioner, said storage container comprising an outer rigid structure and an inner metal compartment disposed within said outer rigid structure, an intermediate insulating structure disposed between said outer rigid structure and said inner metal compartment in a nested relationship therewith, each of said outer rigid structure, said inner metal compartment and said intermediate insulating structure having a top, bottom, four upwardly extending walls and an opening in said top; a rigid plastic cover having inner and outer surfaces and a shallow wall surrounding said inner surface pivotally attached to said outer rigid plastic structure for opening and closing said storage container and fastening means for maintaining said cover in a closed position, a fan, a light, a battery and an electrical circuit operatively connecting said fan, light and battery disposed on and fixed to said inner surface of said cover within an area defined by said shallow wall, a switch for turning said light and said fan off and on disposed in said electrical circuit and on said inner surface of said cover and operable from said outside surface of said cover; and said cover including an air outlet adjacent to said fan for exhausting heating and cooling air from within said chamber; an air inlet disposed in one of said side walls of said rigid plastic structure and extending through said inner metal chamber and said intermediate insulating structure for introducing heated or cooled air into said chamber, an elongated flexible conduit having a first end attached to said air inlet and a second end adapted for attachment to an automobile air vent for delivering heated and cooled air to said storage container whereby said container is heated or cooled by an automobile heater and air conditioner.

2. A portable food storage chamber according to claim 1 which includes a second battery and separate switch for turning said light on and off independently of said fan.

3. A portable food storage chamber according to claim 1 which includes valve means for closing said air inlet to thereby isolate said chamber from an automobile heater and air conditioner.

4. A portable food storage container according to claim 3 which includes a filter between said air inlet and said elongated flexible conduit.

5. A portable food storage container according to claim 3 in which said metal compartment is made of galvanized metal.

6. A portable food storage container according to claim 3 in which said metal compartment is made of zinc.

7. A portable food storage chamber according to claim 6 in which said intermediate insulating structure is made of wood.

8. A portable food storage container according to claim 7 in which opposite side walls are parallel to one another and wherein said top and bottom are parallel to thereby form a generally box-shaped structure.

9. A portable food storage container according to claim 8 which includes a carrying handle disposed on the outer surface of said cover.

* * * * *